United States Patent
Lu et al.

(10) Patent No.: US 9,842,533 B2
(45) Date of Patent: Dec. 12, 2017

(54) DEVICE AND METHOD FOR GAMMA COMPENSATION AND DISPLAY DEVICE

(71) Applicant: EVERDISPLAY OPTRONICS (SHANGHAI) LIMITED, Shanghai (CN)

(72) Inventors: Jiahao Lu, Shanghai (CN); Pengtao Kang, Shanghai (CN); Sisi Zhou, Shanghai (CN)

(73) Assignee: EverDisplay Optronics (Shanghai) Limited, Shanghai (CN)

( * ) Notice: Subject to any disclaimer, the term of this patent is extended or adjusted under 35 U.S.C. 154(b) by 49 days.

(21) Appl. No.: 15/192,010

(22) Filed: Jun. 24, 2016

(65) Prior Publication Data
US 2017/0025059 A1   Jan. 26, 2017

(30) Foreign Application Priority Data

Jul. 24, 2015 (CN) .......................... 2015 1 0439855

(51) Int. Cl.
*G09G 3/20* (2006.01)
*G06F 1/16* (2006.01)

(52) U.S. Cl.
CPC ......... *G09G 3/2096* (2013.01); *G06F 1/1652* (2013.01); *G06F 1/1677* (2013.01); *G09G 3/20* (2013.01); *G09G 3/2007* (2013.01); *G09G 2300/08* (2013.01); *G09G 2320/0276* (2013.01); *G09G 2320/0673* (2013.01); *G09G 2330/028* (2013.01); *G09G 2380/02* (2013.01)

(58) Field of Classification Search
CPC .............. G09G 3/2096; G09G 3/2007; G09G 2300/08; G06F 1/1652; G06F 1/1677
See application file for complete search history.

(56) References Cited

U.S. PATENT DOCUMENTS

| | | | | |
|---|---|---|---|---|
| 4,269,919 A | * | 5/1981 | Kuehnle | G03G 5/082 204/192.26 |
| 2007/0052636 A1 | * | 3/2007 | Kalt | G09G 3/34 345/83 |
| 2010/0110069 A1 | * | 5/2010 | Yuan | G06T 15/20 345/419 |

* cited by examiner

*Primary Examiner* — Ricardo L Osorio
(74) *Attorney, Agent, or Firm* — Yunling Ren (57) ABSTRACT

The present disclosure provides a display device, a device and a method for gamma compensation. The device for gamma compensation includes: a flexure recording module, provided in a flexible display panel, and configured to acquire a flexure count of the flexible display panel; a parameter inquiring module, connected to the flexure recording module, and configured to inquire a corresponding gamma correction value from a comparison table involving a correspondence between flexure counts of the flexible display panel and gamma correction values according to the flexure count of the flexible display panel; and a voltage output module, connected to the parameter inquiring module, and configured to provide a gamma compensation voltage to the flexible display panel according to the gamma correction value.

20 Claims, 8 Drawing Sheets

Fig. 1

| Flexure count | Gamma correction value ($\Delta$Vth) |
|---|---|
| 100 | 0.2 |
| ...... | ...... |
| 1000 | X |
| ...... | ...... |
| 10000 | Y |
| ...... | ...... |
| 100000 | Z |
| ...... | ...... |

Fig. 2

| Gray level | Gamma compensation voltage (initial) | Gamma compensation voltage (after 100 flexures) |
|---|---|---|
| 1 | V1(0.144V) | V1+ΔVth |
| 2 | V2(1.16V) | V2+ΔVth |
| 3 | V3(1.45V) | V3+ΔVth |
| 4 | V4(1.69V) | V4+ΔVth |
| 5 | V5(1.89V) | V5+ΔVth |
| 6 | V6(2.14V) | V6+ΔVth |
| 7 | V7(2.505V) | V7+ΔVth |
| 8 | V8(3.718V) | V8+ΔVth |

DEVICE AND METHOD FOR GAMMA COMPENSATION AND DISPLAY DEVICE

CROSS-REFERENCE TO RELATED APPLICATIONS

This application is based upon and claims priority to Chinese Patent Application 201510439855.9, filed on Jul. 24, 2015, the entire contents of which are incorporated herein by reference.

TECHNICAL FIELD

The present disclosure relates to a technical field of display technology, and more particularly, to a device and a method for gamma compensation and a display device.

BACKGROUND

With the development of optical technology and semiconductor technology, flat panel displays such as liquid crystal displays, OLED (organic light emitting diode) displays are replacing conventional display devices for their advantages such as high image quality, small volume, light weight, thin thickness, low driving voltage and low power consumption. The flat panel displays are widely applied, for example, in electronic products such as laptops, cellphones, televisions, digital photo frames, and the like.

Gamma compensation technology is widely used to improve display quality of flat panel displays. For example, a gamma compensation device is generally required in a flat panel display, the gamma compensation device generates according to a gray level to be displayed a preset gamma compensation voltage corresponding to the gray level and transmits the generated gamma compensation voltage to the source driver of the flat panel display, and the source driver generates a data signal corresponding to the gray level to be displayed according to the received gamma compensation voltage and applies the data signal to each pixel unit.

In the related art, one basis for setting gamma compensation voltage is the electrical characteristics of the driving transistors in the display panel. When the gamma compensation voltage is set, the value thereof will not change in the following display procedures. That is, the gamma compensation voltage corresponding to each gray level is constant. No problem will occur in such a gamma compensation method in a display panel manufactured using a glass substrate.

However, bendable, rollable and foldable display panels, i.e., flexible display panels, have been developed recently for various requirements of more electrical products. When the above gamma compensation method is applied in a flexible display panel, electrical characteristic of the driving transistor in the display panel may be affected to some extent by the flexure actions due to the inevitable bending, rolling or folding of the flexible display panel. When the above flexure actions occur for a certain times, the electrical characteristics of the driving transistor may vary greatly in comparison with the initially set gamma compensation voltage. That is, the initially set gamma compensation voltage is not suitable anymore, thereby deteriorating the display effect of the flexible display panel.

SUMMARY

The present disclosure is directed to provide a device and a method for gamma compensation and a display device.

Other characteristics and advantages of the present disclosure will become apparent from the following detailed description, or in part, may be learned from implementation of the present disclosure.

According to a first aspect of the present disclosure, there is provided a device for gamma compensation in a flexible display panel, including:

a flexure recording module, provided in the flexible display panel, and configured to acquire a flexure count of the flexible display panel;

a parameter inquiring module, connected to the flexure recording module, and configured to inquire a corresponding gamma correction value from a comparison table involving a correspondence between flexure counts of the flexible display panel and gamma correction values according to the flexure count of the flexible display panel; and a voltage output module, connected to the parameter inquiring module, and configured to provide a gamma compensation voltage to the flexible display panel according to the gamma correction value.

According to a second aspect of the present disclosure, there is provided a method for gamma compensation in a flexible display panel, including:

step S1, acquiring a flexure count of the flexible display panel;

step S2, inquiring a corresponding gamma correction value from a comparison table involving a correspondence between flexure counts of the flexible display panel and gamma correction values according to the flexure count of the flexible display panel; and step S3, providing a gamma compensation voltage to the flexible display panel according to the inquired gamma correction value.

According to a third aspect of the present disclosure, there is provided a display device, including a flexible display panel and a device for gamma compensation, wherein the flexible display panel includes a flexible substrate, a plurality of pixel units provided in the flexible substrate, and a source driver electrically connected to the plurality of pixel units, and the device for gamma compensation is any one of the above devices for gamma compensation configured to provide a gamma compensation voltage to the source driver, wherein the device for gamma compensation includes:

a flexure recording module, provided in a flexible display panel, and configured to acquire a flexure count of the flexible display panel;

a parameter inquiring module, connected to the flexure recording module, and configured to inquire a corresponding gamma correction value from a comparison table involving a correspondence between flexure counts of the flexible display panel and gamma correction values according to the flexure count of the flexible display panel; and a voltage output module, connected to the parameter inquiring module, and configured to provide a gamma compensation voltage to the flexible display panel according to the gamma correction value.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure. It will be obvious that the drawings in the following description are some embodiments of the present

DESCRIPTION OF REFERENCE SYMBOLS IN DRAWINGS

10: device for gamma compensation
11: flexure recording module
111: proximity sensor
112: hall sensor
12: parameter inquiring module
13: voltage output module
14: storage module
20: flexible display panel
21: flexible substrate
22: source driver
23: gate driver
P: pixel unit

DETAILED DESCRIPTION

Exemplary embodiments will now be described more fully with reference to the accompanying drawings. However, the exemplary embodiments can be implemented in various forms and should not be understood as being limited to the embodiments set forth herein; rather, these embodiments are provided so that the present disclosure will be thorough and complete, and the concept of exemplary embodiments will be fully conveyed to those skilled in the art. In the drawings, the same reference numerals denote the same or similar structures, thus their detailed description will be omitted.

In addition, the described features, structures, or characteristics may be combined in one or more embodiments in any suitable manner. In the following description, numerous specific details are provided so as to allow a full understanding of the embodiments of the present disclosure. However, those skilled in the art will recognize that the technical solutions of the present disclosure may be practiced without one or more of the specific details, or other components, steps and so on may be used. In other cases, the well-known structures are not shown or described in detail to avoid obscuring various aspects of the present disclosure.

Figure 1:
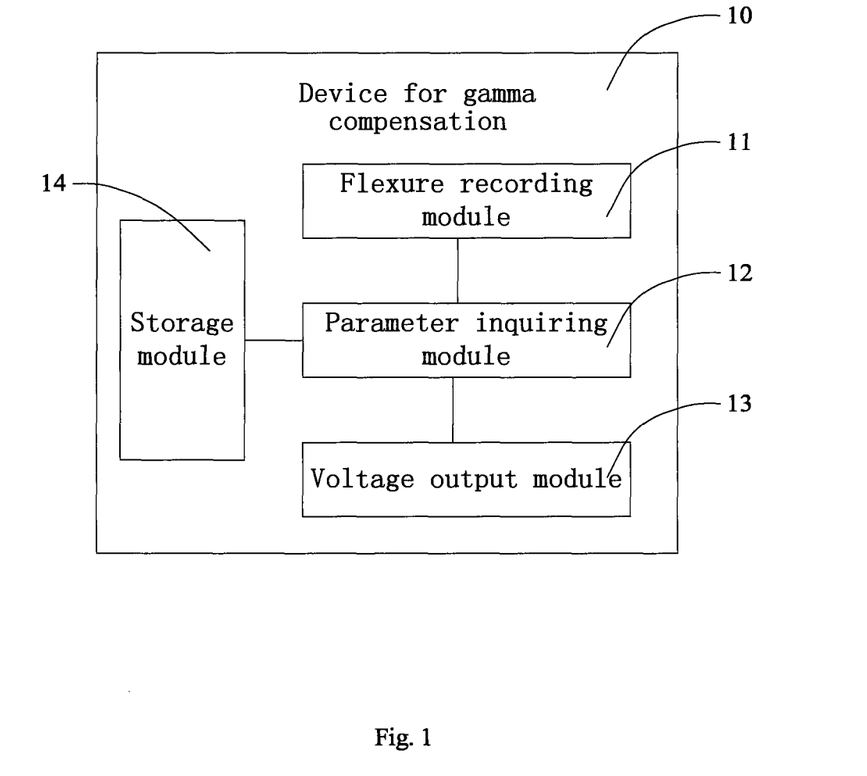
FIG. 1 is a block diagram of a device for gamma compensation in an implementation of the present disclosure.

In the present embodiment, firstly, a device for gamma compensation is provided. As illustrated in FIG. 1, a device for gamma compensation 10 includes a flexure recording module 11, a parameter inquiring module 12 and a voltage output module 13. In addition, the device for gamma compensation 10 may further include other parts such as a storage module 14 and the like. The flexure recording module 11 is provided in a flexible display panel, and is configured to acquire a flexure count of the flexible display panel. In the present exemplary embodiment, the flexible display panel is a bendable, rollable and foldable display panel, which may be an OLED display panel, a liquid crystal display panel and the like. In the present disclosure, the flexure may be an action of bending, rolling, folding and the like. A comparison table involving a correspondence between flexure counts of the flexible display panel and gamma correction values may be previously stored in the storage module 14. The parameter inquiring module 12 is connected to the flexure recording module 11, and is configured to inquire, according to the flexure count of the flexible display panel acquired by the flexure recording module 11, from the comparison table a gamma correction value corresponding to the flexure count. The voltage output module 13 is connected to the parameter inquiring module 12, and is configured to provide to the flexible display panel a gamma compensation voltage according to the gamma correction value inquired by the parameter inquiring module 12.

In the present exemplary embodiment, the flexure count of the flexible display panel is acquired, and the gamma compensation voltage is provided to the flexible display panel according to the corresponding gamma correction value selected according to the flexure count of the flexible display panel. In the present exemplary embodiment, the gamma compensation voltage provided by the device for gamma compensation 10 is dynamically variable according to the flexure count of the flexible display panel. Therefore, in comparison with the prior art, a problem that the gamma compensation voltage provided by the device for gamma compensation 10 is no longer suitable after a certain flexure count of the flexible display panel may be prevented, such that a better display quality may be provided.

Figure 2:
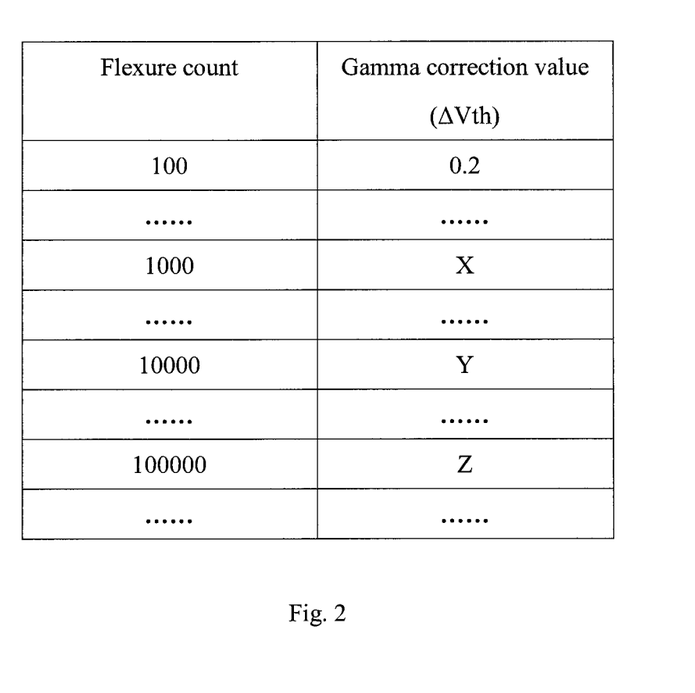
FIG. 2 is a schematic diagram of a comparison table in an implementation of the present disclosure.
Figure 3:
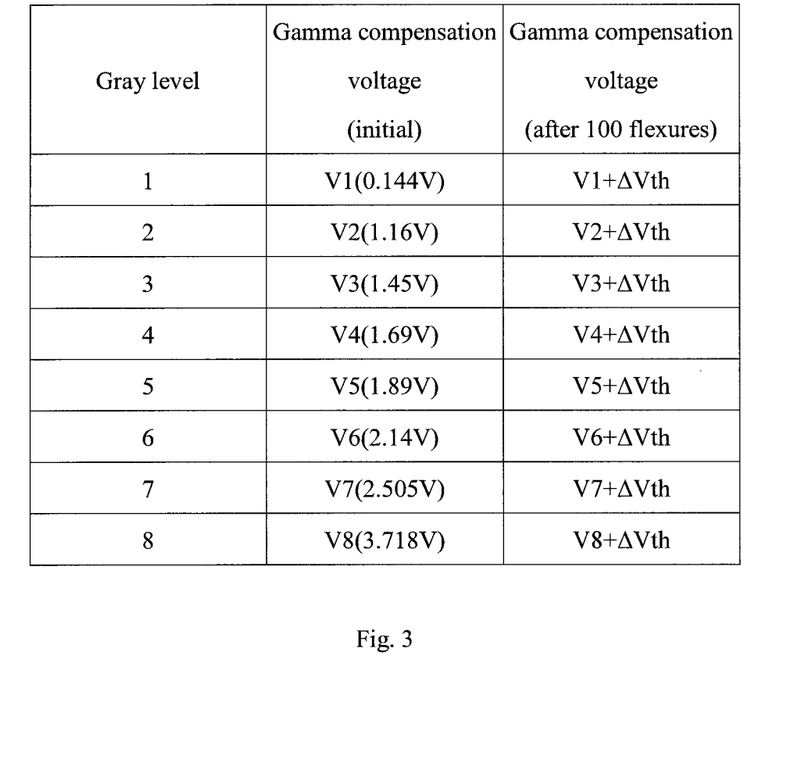
FIG. 3 is a schematic diagram of a gamma compensation voltage table in an implementation of the present disclosure.

Referring to FIG. 2, in the present exemplary embodiment, a correspondence between a plurality of particular flexure counts of the flexible display panel and gamma correction values may be recorded in the comparison table. For example, in FIG. 2, a gamma correction value $\Delta V_{th}$ corresponding to 100 flexure counts of the flexible display panel is 0.2V. As such, when the flexure count of the flexible display panel reaches a particular flexure count, for example, 100 flexure counts, the parameter inquiring module 12 may inquire one gamma correction value corresponding to the particular flexure count, for example, the inquired corresponding gamma correction value $\Delta V_{th}$ is −0.2V. The voltage output module 13 provides to the flexible display panel a gamma compensation voltage according to a gray level to be displayed, an initial gamma compensation voltage and the gamma correction value $\Delta V_{th}$. For example, after 100 flexure counts of the flexible display panel, the voltage output module 13 provides a gamma compensation voltage of 1.89V+(−0.2V)=1.69V according to table 3 when the gray level to be displayed is 5.

Figure 4:
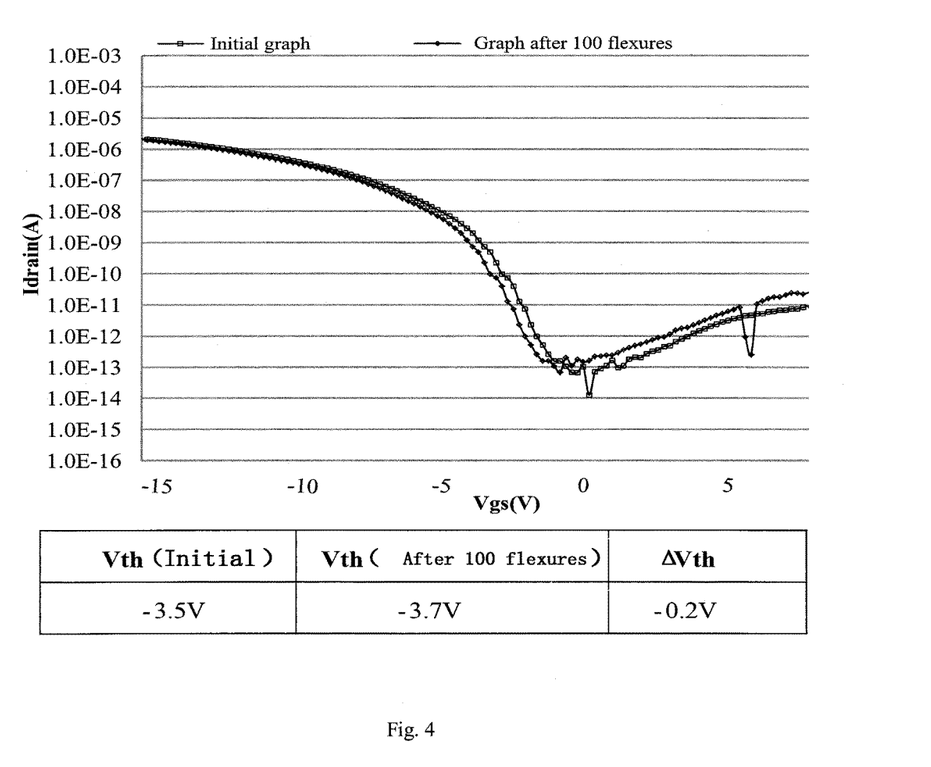
FIG. 4 is a comparative schematic diagram of electrical characteristics of the driving transistor before and after the flexure of the flexible display panel in an implementation of the present disclosure.

The above correspondence between the particular flexure counts and the gamma correction values may be obtained by calculating the change in electrical characteristics of the driving transistor under the particular flexure count of the flexible display panel. Referring to FIG. 4, which illustrates graphs between the output driving current Idrain and the gate/source voltage Vgs of the flexible display panels without flexure and after 100 flexures, when a source/drain voltage Vds of the driving transistor in the flexible display panel is 10V. As can be seen from FIG. 4, in comparison with the flexible display panel without flexure, a threshold voltage Vth of the driving transistor in the flexible display panel after 100 flexures offsets −0.2V. Accordingly, the gamma correction value corresponding to 100 flexure counts of the flexible display panel may be set as 0.2V. Similarly, gamma correction values corresponding to other flexure counts of the flexible display panel may be obtained, thereby establishing the comparison table illustrated in FIG. 2.

In the present exemplary embodiment, the flexure recording module 11 may include a sensing element and a recording unit. The sensing element is provided in the flexible display panel, and is configured to output a sensing signal upon sensing a flexure of the flexible display panel. The recording unit is connected to the sensing element, and is configured to acquire the flexure count of the flexible display panel according to the received sensing signal.

Figure 5:
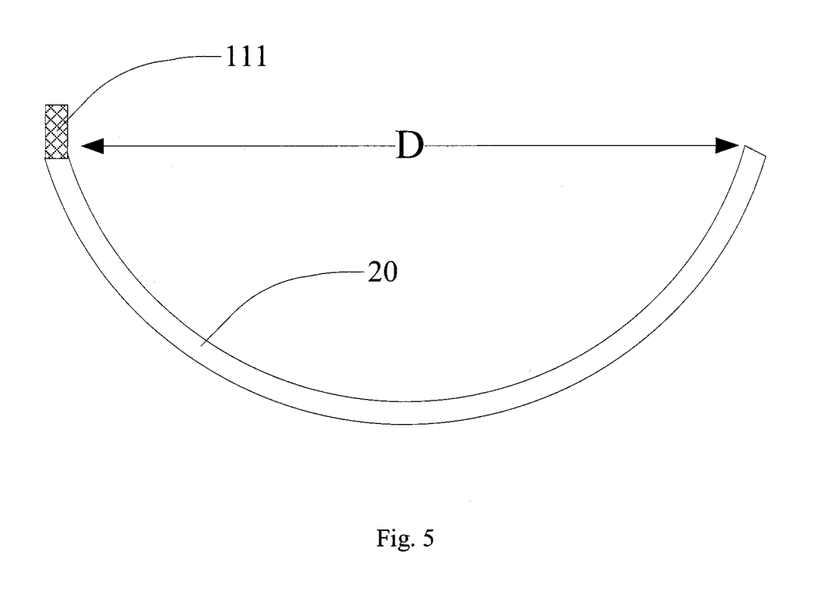
FIG. 5 is a schematic diagram for providing a sensing element in an implementation of the present disclosure.
Figure 6:
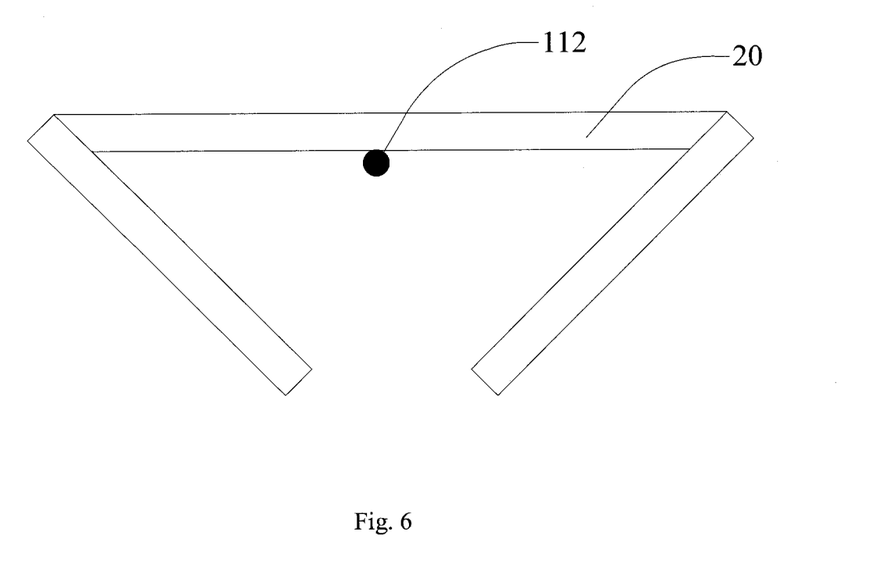
FIG. 6 is another schematic diagram for providing a sensing element in an implementation of the present disclosure.

The above sensing element may include one or more of a proximity sensor, a hall sensor, a strainmeter, a piezoelectric material and other available sensing elements. The way of providing the sensing element may vary according to different type of sensing element. For example, referring to FIG. 5, a proximity sensor 111 performing sensing mainly using infrared ray may be provided at an edge of the flexible display panel, and a flexure of the flexible display panel is determined when a change in a distance D between the opposite edge of the flexible display panel and the edge is detected (e.g., when the distance D is smaller than a particular distance), thereby outputting one above sensing signal. For further example, referring to FIG. 6, a hall sensor 112 sensing the flexure of the flexible display panel mainly using electromagnetic induction may be provided in the central location of the flexible display panel. Moreover, the above sensing element may be provided on the surface of or inside the flexible display panel according to their different sensing principles. The above recording unit may be a counter or a device that performs counting, which is not particularly limited in the present exemplary embodiment.

Figure 7:
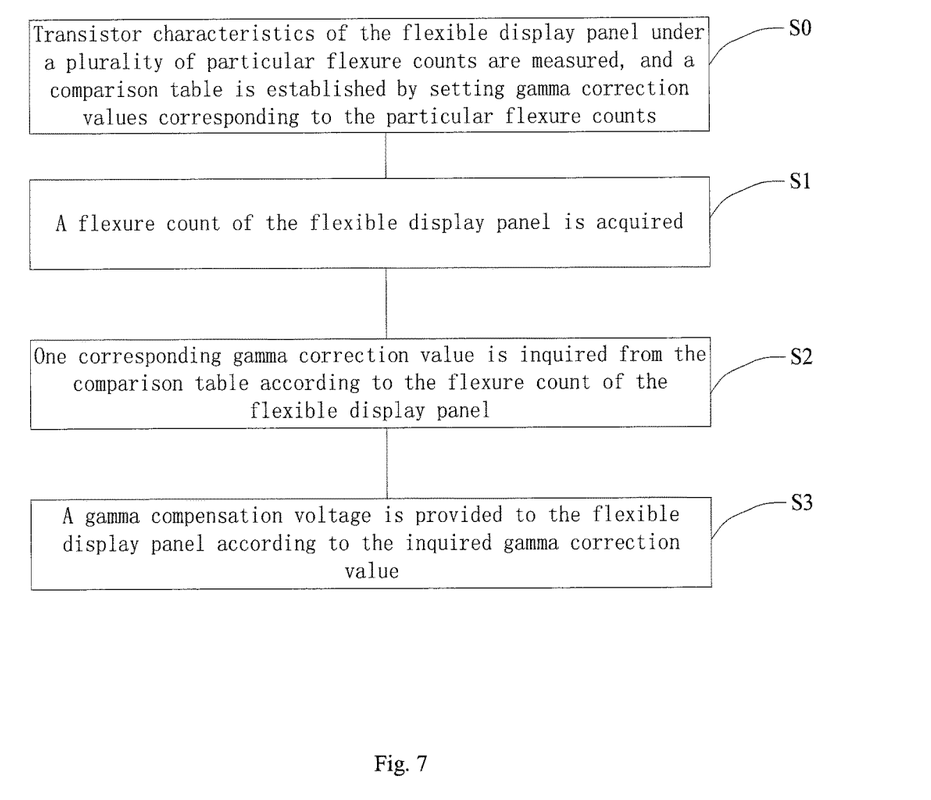
FIG. 7 is a flow chart showing a method for gamma compensation in an implementation of the present disclosure.

Referring to FIG. 7, an exemplary embodiment further provides a method for gamma compensation corresponding to the above device for gamma compensation. The method for gamma compensation may include:

step S1, acquiring a flexure count of a flexible display panel;

step S2, inquiring a corresponding gamma correction value from a comparison table involving a correspondence between flexure counts of the flexible display panel and gamma correction values according to the flexure count of the flexible display panel; and step S3, providing a gamma compensation voltage to the flexible display panel according to the inquired gamma correction value.

Further referring to FIG. 7, before step S1, the method for gamma compensation may further include:

step S0, measuring electrical characteristics of a driving transistor of the flexible display panel under a plurality of particular flexure counts, and establishing a comparison table by setting gamma correction values corresponding to the particular flexure counts according to the electrical characteristics of the driving transistor.

Detailed embodiments of each step in the method for gamma compensation according to the present exemplary embodiment and many details have been described with respect to the above device for gamma compensation, thus they are not repeated herein.

Figure 8:
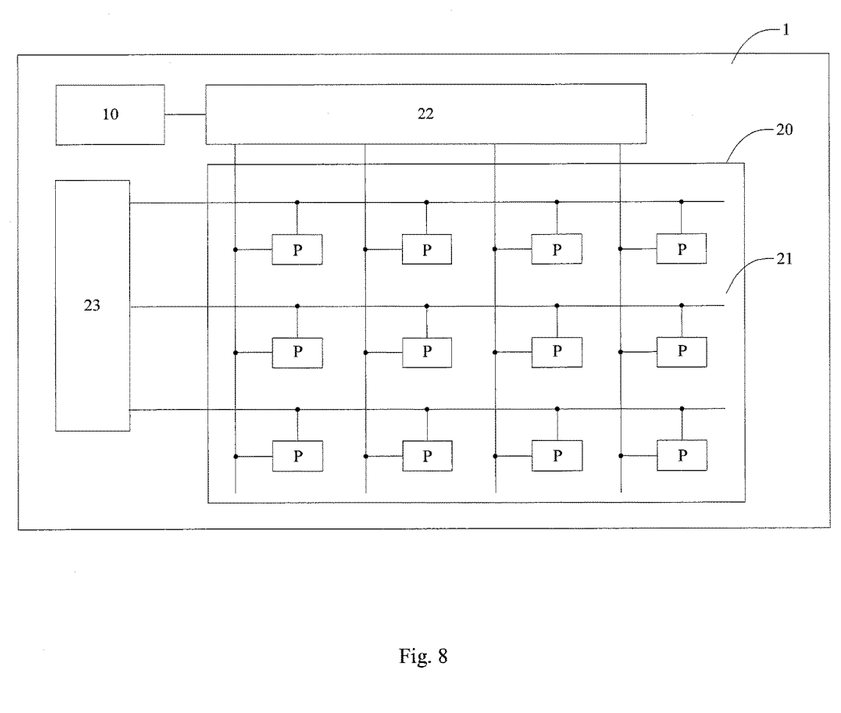
FIG. 8 is a structural schematic diagram of a display device in an implementation of the present disclosure.

Furthermore, an exemplary embodiment further provides a display device. Referring to FIG. 8, the display device 1 may include a flexible display panel 20 and a device for gamma compensation 10 in the above exemplary embodiments. The flexible display panel 20 may include a flexible substrate 21 and a plurality of pixel units P provided on the flexible substrate 21. In addition, the flexible display panel 20 may further include other parts such as a gate driver 23, a source driver 22 and a touch control module (not illustrated) that are connected to each of the pixel units P. The display panel may be an OLED display panel, a liquid crystal display panel, an EPD display panel and the like, which is not particularly limited in the present exemplary embodiment.

The present disclosure has been described with reference to the related embodiments, however, the above embodiments are only examples for implementing the present disclosure. It should be noted that the disclosed embodiments do not limit the scope of the present disclosure. Rather, changes and modifications without departing from the spirit and scope of the present disclosure belong to the protection scope of the present disclosure.

What is claimed is:

1. A device for gamma compensation in a flexible display panel, comprising:
    a flexure recording module, provided in the flexible display panel, and configured to acquire a flexure count of the flexible display panel;
    a parameter inquiring module, connected to the flexure recording module, and configured to inquire a corresponding gamma correction value from a comparison table involving a correspondence between flexure counts of the flexible display panel and gamma correction values according to the flexure count of the flexible display panel; and
    a voltage output module, connected to the parameter inquiring module, and configured to provide a gamma compensation voltage to the flexible display panel according to the gamma correction value.

2. The device for gamma compensation in a flexible display panel according to claim 1, wherein:
    the comparison table involves a correspondence between a plurality of particular flexure counts of the flexible display panel and the gamma correction values; and
    when the flexure count of the flexible display panel reaches a particular flexure count, the parameter inquiring module inquires one of the gamma correction values corresponding to the particular flexure count.

3. The device for gamma compensation in a flexible display panel according to claim 2, wherein the flexure recording module comprises:
    a sensing element, provided in the flexible display panel, and configured to output a sensing signal upon sensing a flexure of the flexible display panel; and
    a recording unit, connected to the sensing element, and configured to acquire the flexure count of the flexible display panel according to the received sensing signal.

4. The device for gamma compensation in a flexible display panel according to claim 3, wherein the sensing element at least comprises one of following units comprising: a proximity sensor, a hall sensor, a strainmeter and a piezoelectric material.

5. The device for gamma compensation in a flexible display panel according to claim 1, wherein the flexure recording module comprises:

a sensing element, provided in the flexible display panel, and configured to output a sensing signal upon sensing a flexure of the flexible display panel; and a recording unit, connected to the sensing element, and configured to acquire the flexure count of the flexible display panel according to the received sensing signal.

6. The device for gamma compensation in a flexible display panel according to claim 5, wherein the sensing element at least comprises one of following units comprising: a proximity sensor, a hall sensor, a strainmeter and a piezoelectric material.

7. A method for gamma compensation in a flexible display panel, comprising:

step S1, acquiring a flexure count of the flexible display panel;

step S2, inquiring a corresponding gamma correction value from a comparison table involving a correspondence between flexure counts of the flexible display panel and gamma correction values according to the flexure count of the flexible display panel; and step S3, providing a gamma compensation voltage to the flexible display panel according to the inquired gamma correction value.

8. The method for gamma compensation in a flexible display panel according to claim 7, before step S1 further comprising:

step S0, measuring electrical characteristics of a driving transistor of the flexible display panel under a plurality of particular flexure counts, and establishing a comparison table by the setting gamma correction values corresponding to the particular flexure counts according to the electrical characteristics of the driving transistor.

9. The method for gamma compensation in a flexible display panel according to claim 8, wherein in the step S2, one gamma correction value corresponding to the particular flexure count is inquired when the flexure count of the flexible display panel reaches a particular flexure count.

10. The method for gamma compensation in a flexible display panel according to claim 9, wherein the step S1 comprises:

providing a sensing element configured to output a sensing signal upon sensing a flexure of the flexible display panel; and receiving the sensing signal and acquiring the flexure count of the flexible display panel according to the received sensing signal.

11. The method for gamma compensation in a flexible display panel according to claim 8, wherein the step S1 comprises:

providing a sensing element configured to output a sensing signal upon sensing a flexure of the flexible display panel; and receiving the sensing signal and acquiring the flexure count of the flexible display panel according to the received sensing signal.

12. The method for gamma compensation in a flexible display panel according to claim 11, wherein the sensing element at least comprises one of following units comprising: a proximity sensor, a hall sensor, a strainmeter and a piezoelectric material.

13. The method for gamma compensation in a flexible display panel according to claim 7, wherein the step S1 comprises:

providing a sensing element configured to output a sensing signal upon sensing a flexure of the flexible display panel; and receiving the sensing signal and acquiring the flexure count of the flexible display panel according to the received sensing signal.

14. The method for gamma compensation in a flexible display panel according to claim 13, wherein the sensing element comprises one or more of a proximity sensor, a hall sensor, a strainmeter and a piezoelectric material.

15. A display device, comprising:

a flexible display panel, comprising:
a flexible substrate;
a plurality of pixel units provided in the flexible substrate; and
a source driver electrically connected to the plurality of pixel units; and a device for gamma compensation configured to provide a gamma compensation voltage to the source driver, wherein the device for gamma compensation comprises:

a flexure recording module, provided in a flexible display panel, and configured to acquire a flexure count of the flexible display panel;

a parameter inquiring module, connected to the flexure recording module, and configured to inquire a corresponding gamma correction value from a comparison table involving a correspondence between flexure counts of the flexible display panel and gamma correction values according to the flexure count of the flexible display panel; and a voltage output module, connected to the parameter inquiring module, and configured to provide a gamma compensation voltage to the flexible display panel according to the gamma correction value.

16. The display device according to claim 15, wherein:

the comparison table involves a correspondence between a plurality of particular flexure counts of the flexible display panel and gamma correction values; and when the flexure count of the flexible display panel reaches a particular flexure count, the parameter inquiring module inquires one gamma correction value corresponding to the particular flexure count.

17. The display device according to claim 16, wherein the flexure recording module comprises:

a sensing element, provided in the flexible display panel, and configured to output a sensing signal upon sensing a flexure of the flexible display panel; and a recording unit, connected to the sensing element, and configured to acquire the flexure count of the flexible display panel according to the received sensing signal.

18. The display device according to claim 17, wherein the sensing element at least comprises one of following units comprising: a proximity sensor, a hall sensor, a strainmeter and a piezoelectric material.

19. The display device according to claim 15, wherein the flexure recording module comprises:

a sensing element, provided in the flexible display panel, and configured to output a sensing signal upon sensing a flexure of the flexible display panel; and a recording unit, connected to the sensing element, and configured to acquire the flexure count of the flexible display panel according to the received sensing signal.

20. The display device according to claim 19, wherein the sensing element at least comprises one of following units comprising: a proximity sensor, a hall sensor, a strainmeter and a piezoelectric material.

* * * * *